United States Patent
Briggs et al.

(10) Patent No.: US 7,978,357 B2
(45) Date of Patent: Jul. 12, 2011

(54) PRINTING SYSTEM AND METHOD THAT USES A UNIVERSAL SERIAL BUS (USB) HIGH-SPEED INTERRUPT OUT PIPE TO TRANSFER PRINT DATA FROM THE HOST COMPUTER TO THE PRINTER

(75) Inventors: Randall Don Briggs, Boise, ID (US); Frederick Walter Pew, Meridian, ID (US); Mark David Montierth, Meridian, ID (US)

(73) Assignee: Marvell International Technology Ltd. (BM)

( * ) Notice: Subject to any disclaimer, the term of this patent is extended or adjusted under 35 U.S.C. 154(b) by 1021 days.

(21) Appl. No.: 11/343,136

(22) Filed: Jan. 30, 2006

(65) Prior Publication Data

US 2007/0177190 A1  Aug. 2, 2007

(51) Int. Cl.
*G06F 3/12* (2006.01)
(52) U.S. Cl. ...................................... 358/1.15; 358/1.16
(58) Field of Classification Search .......................... None
See application file for complete search history.

(56) References Cited

U.S. PATENT DOCUMENTS

| | | | | | |
|---|---|---|---|---|---|
| 5,634,090 | A | * | 5/1997 | Narukawa et al. | 358/1.16 |
| 5,887,989 | A | * | 3/1999 | Hannah | 400/61 |
| 5,999,272 | A | * | 12/1999 | Dow et al. | 358/1.15 |
| 6,097,499 | A | * | 8/2000 | Casey et al. | 358/1.16 |
| 6,304,335 | B1 | * | 10/2001 | Furuya et al. | 358/1.15 |
| 6,307,974 | B1 | * | 10/2001 | Tsujimoto | 382/239 |
| 6,434,643 | B1 | * | 8/2002 | Ejiri | 710/58 |
| 6,665,088 | B1 | * | 12/2003 | Chiba et al. | 358/1.17 |
| 6,718,412 | B2 | * | 4/2004 | Purcell et al. | 710/109 |
| 6,728,853 | B1 | * | 4/2004 | Greicar | 711/170 |
| 7,369,264 | B2 | * | 5/2008 | Kobayashi | 358/1.16 |
| 7,428,068 | B2 | * | 9/2008 | Kadoi et al. | 358/1.15 |
| 7,447,976 | B2 | * | 11/2008 | Takamatsuya | 714/766 |
| 7,454,796 | B2 | * | 11/2008 | Mazzagatte et al. | 726/28 |
| 7,461,318 | B2 | * | 12/2008 | Fukae et al. | 714/749 |
| 7,463,373 | B2 | * | 12/2008 | Lapstun et al. | 358/1.1 |
| 7,489,414 | B2 | * | 2/2009 | Saida | 358/1.15 |
| 7,533,200 | B2 | * | 5/2009 | Kubota | 710/36 |
| 2003/0234952 | A1 | * | 12/2003 | Abe | 358/1.14 |
| 2004/0207869 | A1 | * | 10/2004 | Endo | 358/1.15 |
| 2005/0033877 | A1 | * | 2/2005 | McLeod | 710/33 |
| 2006/0224936 | A1 | * | 10/2006 | Takamatsuya | 714/766 |

* cited by examiner

*Primary Examiner* — King Y Poon
*Assistant Examiner* — Dung D Tran

(57) ABSTRACT

In accordance with the invention, it has been determined that the bandwidth, guaranteed periodic delivery and error correction characteristics of a USB High-Speed Interrupt OUT pipe of the USB 2.0 standard enable the Interrupt OUT pipe to be used to transfer print data from the host computer to the printer. By using the Interrupt OUT pipe for this purpose, it is no longer necessary to store an entire rasterized page in the formatter memory of the printer before commencing printing of the page. Consequently, the size of the formatter memory device can be relatively small compared to the size of the formatter memory device that is currently used to store an entire rasterized page. Alternatively, the same size memory device as that currently used to store an entire rasterized page may be used to enable higher resolution pages to be printed.

26 Claims, 4 Drawing Sheets

PRINTING SYSTEM AND METHOD THAT USES A UNIVERSAL SERIAL BUS (USB) HIGH-SPEED INTERRUPT OUT PIPE TO TRANSFER PRINT DATA FROM THE HOST COMPUTER TO THE PRINTER

TECHNICAL FIELD OF THE INVENTION

The invention relates to printing systems and, more particularly, to a printing system that utilizes a Universal Serial Bus (USB) High-Speed Interrupt OUT pipe between the host computer and the printer to transfer print data from the host computer to the printer.

BACKGROUND OF THE INVENTION

In the printing industry, two types of printing systems dominate, namely, host-based printing systems and page description language (PDL)-based printing systems. In host-based printing systems, the host computer (e.g., a personal computer (PC)) rather than the printer performs most of the computations associated with performing the print job. Therefore, a relatively inexpensive printer with relatively inexpensive hardware can be used for printing. In PDL-based printing systems, the printer rather than the host performs most of the computations associated with performing the print job. Therefore, the printers that are used in PDL-based printing systems require more sophisticated hardware than those used in host-based printing systems and are typically more expensive.

FIG. 1 illustrates a block diagram of a typical known host-based printing system 1. The system 1 includes a host computer 2, which is typically a PC, a printer 3 and a USB interface 4. The printer 3 and the host computer 2 are interconnected by the USB interface. When a user instructs the host computer 2 to perform a print job, a rasterizer 5 of the host computer 2 rasterizes the image data and outputs the rasterized image data to a color space converter 6. The color space converter 6 performs an algorithm that converts red, green, blue (RGB) pixel data into cyan,. magenta, yellow, black (CMYK) data. The CMYK data generated by the color space converter 6 is provided to a print quality processor 7. The print quality processor 7 performs tasks such as edge detection, trapping, sharpening and coring.

The processed image data output from the print quality processor 7 is delivered to a halftoner 8. The halftoner 8 performs an algorithm that generates patterns made up of dots of the primary colors (CMYK) that together produce shading that gives the printed image the appearance of continuous color tones. The output of the halftoner 8 is provided to a data compressor 9, which compresses the data in accordance with a compression algorithm, such as an algorithm that complies with the Joint Bi-Level Image Experts Group (JBIG) standards. The compressed image data is then transmitted over the USB interface 4 from the host computer 2 to the printer 3.

The printer 3 receives the compressed image data and stores it in memory (not shown) of the printer 3. Compressing the image data provides the USB connection with more effective bandwidth, and requires less memory in the printer. A formatter of the printer 3 then reads the image data from memory of the printer 3, decompresses it, and sends it to the print engine (not shown) of the printer, which prints the image.

FIG. 2 illustrates a flowchart that demonstrates the existing print method for a host-based printing system. The printer 3 receives the compressed rasterized page from the host computer 2, as indicated by block 16. The rasterized page received in the printer 3 is stored in the formatter memory, as indicated by block 17. After the entire rasterized page has been stored in the formatter memory, the paper is fed into the print mechanism, as indicated by block 18. As the paper is being fed into the print mechanism, the print engine reads the rasterized data from the formatter memory, decompresses it, and causes the data to be printed on the paper, as indicated by block 19.

The USB interface 4 typically uses a USB Bulk OUT pipe to transfer data from the host computer 2 to the printer 3. This connection has unpredictable bandwidth. Therefore, an entire rasterized page must be resident in the formatter memory of the printer 3 before printing of the page begins. Otherwise, the data may be read out of the formatter memory and printed at a faster rate than it is transferred over the Bulk OUT pipe into the formatter memory (i.e. data underrun), which results in print errors.

For example, the well known Hewlett-Packard (HP) LaserJet 1000 printer is a host-based printing system in which an entire rasterized page is saved in the formatter memory of the printer before printing of the page begins. The rasterized page sent from the host computer to the printer is compressed with a compression ratio of approximately 5 to 1. The maximum compressed page size for an 8.5×11 inch page at 600 dot per inch (dpi) is 750 kilobytes (Kbytes). This particular printer supports up to 15 pages per minute (ppm). Therefore, the corresponding data rate is 187.5 Kbytes per second (Kbytes/Sec), or 1.5 megabits (Mbits)/Sec. This would appear to fit easily within the 8 Mbit/Sec USB Full-Speed bandwidth. However, in order to successfully print a page before the entire page raster has been transferred from the host computer to the printer, the host computer must be able to guarantee timely delivery of the remaining raster.

The USB standard provides two types of endpoints for addressing this timeliness concern, namely, Isochronous endpoints and Interrupt endpoints. An Isochronous endpoint is not suitable for this purpose because it has no mechanism for performing error detection. An Interrupt endpoint has a mechanism for performing error detection. However, the largest packet for a USB Full-Speed Interrupt endpoint is 64 bytes, and it is limited to a single packet per frame at one frame per millisecond. Thus, the maximum bandwidth for a USB Full-Speed Interrupt endpoint is 64 Kbytes/Sec, which is less than the required bandwidth of 187.5 Kbytes/Sec needed by the aforementioned HP LaserJet 1000. Consequently, it is necessary to receive the entire rasterized page in the formatter memory of the printer before printing of a page commences. Because the available bandwidth of the Bulk OUT pipe is sufficient when the entire rasterized page is transferred before the page is printed, and because the Bulk OUT pipe provides for error checking, the Bulk OUT pipe is typically used to transfer the rasterized page between the host computer and the printer.

The necessity of having to transfer an entire rasterized page from the host computer to the printer for storage in the formatter memory of the printer imposes a requirement that the formatter memory be sufficiently large to hold an entire compressed rasterized page. For example, a 600 dot per inch (dpi) printer formatter of a host-based system requires approximately 750 Kbytes of storage, assuming a 5 to 1 data compression ratio. In addition, as the resolution of printers increases, so does the required formatter memory size. For example, a 1200 dpi formatter would need approximately 3 Mbytes of memory.

It would be desirable to provide a host-based printing system that is capable of printing pages at high rates of speed and with high resolution, that does not require the entire rasterized page be resident in the printer formatter memory before printing commences. This desirable scenario is called "race-the-laser" in laser printer parlance, because it is a race to see if raster data can be received by the formatter and prepared for the print mechanism by the time it is needed to be sent to the mechanism. Once the paper starts into the laser printer mechanism, it moves at a constant rate. If the data is tardy, the printed page will fail.

SUMMARY OF THE INVENTION

The invention provides a method and an apparatus for use in a printer. The apparatus comprises a print mechanism, a memory device, a USB interface, and a controller. The USB interface is configured to receive incoming print data sent to the printer from a device that is external to the printer. The memory device is configured to store print data, and is in communication with the print mechanism and the USB interface. The controller is configured to control operations of the printer. The controller causes print data received by the USB interface to be stored in the memory device. The controller causes print data to be read out of the memory device and sent to the print mechanism when a decision is made by the controller that a sufficient amount of print data has been stored in the memory device to commence printing.

The method comprises: receiving print data in a printer via a USB interface of the printer, storing the received print data in a memory device of the printer, deciding whether a sufficient amount of print data has been stored in the memory device to commence printing, and, if a decision is made that a sufficient amount of print data has been stored in the memory device to commence printing, reading print data out of the memory device and sending the print data to a print mechanism of the printer.

These and other features and advantages of the invention will become apparent from the following description, drawings and claims.

BACKGROUND OF THE INVENTION

DETAILED DESCRIPTION OF THE PREFERRED EMBODIMENT

Figure 1:
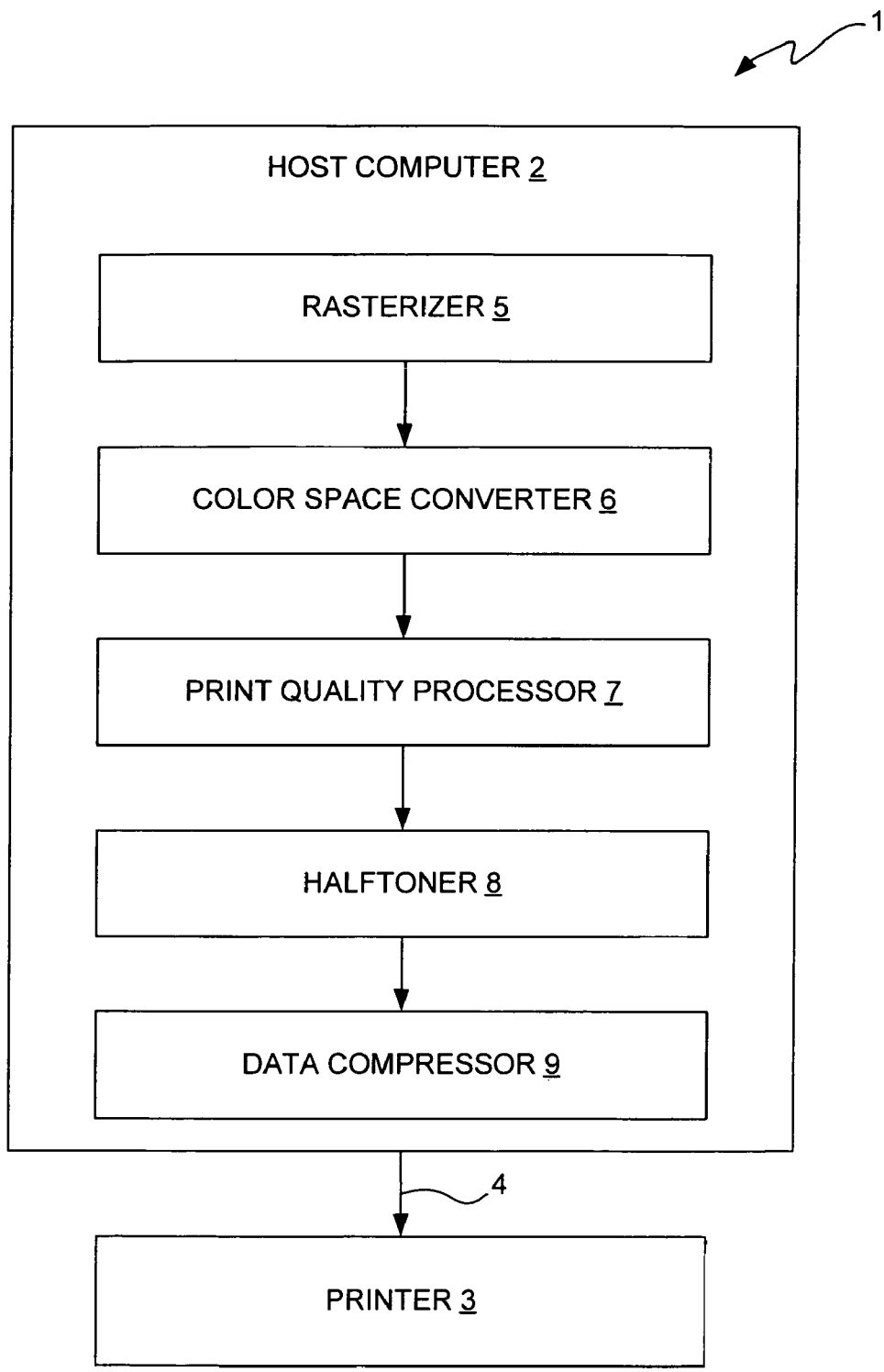
FIG. 1 illustrates a block diagram of a known host-based printing system.
Figure 2:
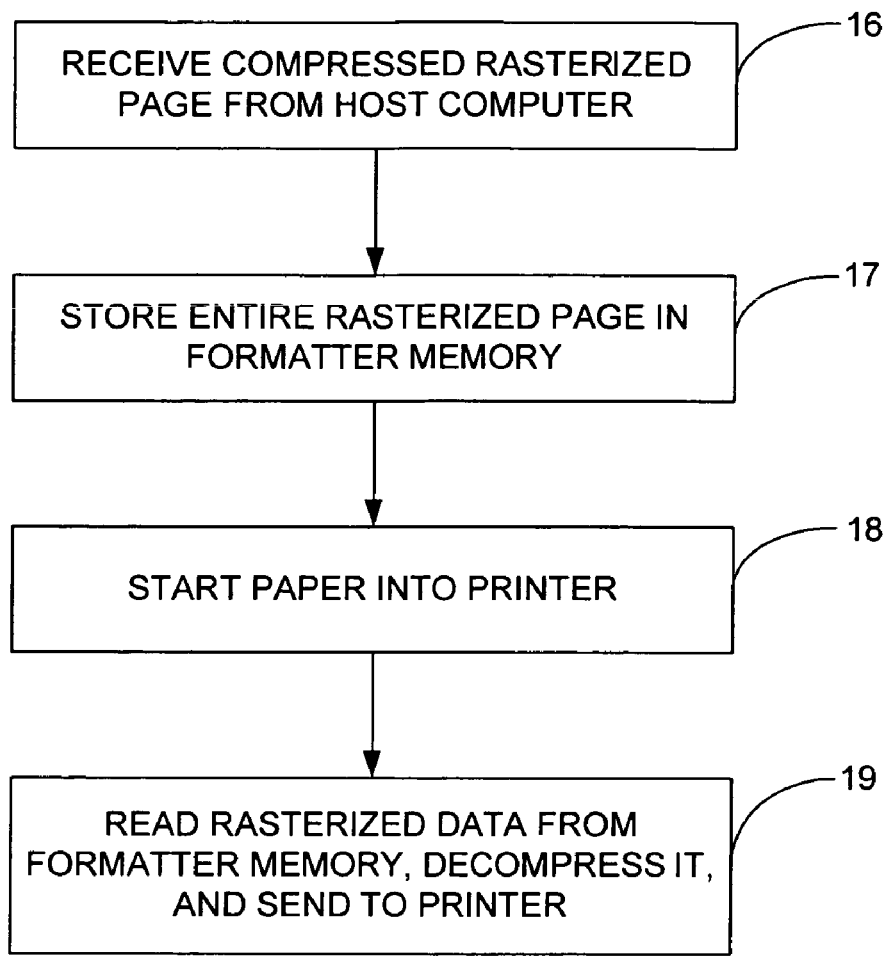
FIG. 2 illustrates a flowchart that represents a method of printing performed by a known host-based printing system.

In accordance with the invention, it has been determined that the Bulk OUT pipe of the USB 2.0 standard is not suitable for use in transferring data from the host computer to the printer in a host-based printing system that uses the aforementioned race-the-laser method. This is because the Bulk OUT pipe of the USB 2.0 standard has no mechanism for guaranteeing timeliness of data delivery.

USB "periodic" transfers may be made using Interrupt and Isochronous pipes. Periodic transfers are restricted to using no more than 80% of the 125-μSec microframe. USB control transfers are guaranteed 20% of the 125-μSec microframe. Bulk IN and Bulk. OUT transfers have no reserved bandwidth and are performed after all scheduled transfers and after any control transfers that software has scheduled for the current microframe. Therefore, the Bulk IN and Bulk OUT transfers are allocated whatever bandwidth of the microframe is left over after the scheduled periodic and control transfers have been made. Consequently, the Bulk OUT pipe is not suitable for use to "race the laser" because the timeliness of data delivery needs to be guaranteed in cases in which an entire rasterized page is not being stored in memory in the printer formatter before printing commences. In other words, if the Bulk OUT pipe were to be used for this purpose, it is possible for data underrun to occur due to print data not being available for the print engine when it is needed by the print engine.

In accordance with the invention, it has been determined that the bandwidth, guaranteed periodic delivery and error correction characteristics of the High-Speed Interrupt OUT pipe of the USB 2.0 standard enable the High-Speed Interrupt OUT pipe to be used to transfer print data from the host computer of a host-based printing system to the printer of the host-based printing system in a race-the-laser fashion. By using the High-Speed Interrupt OUT pipe for this purpose, it is no longer necessary to store an entire rasterized page in the formatter memory of the printer before commencing printing of the page. Consequently, the size of the formatter memory device can be relatively small compared to the size of the formatter memory device that is currently used to store an entire rasterized page. Alternatively, the same size memory device as that currently used to store an entire rasterized page may be used to enable higher resolution pages to be printed.

Another benefit provided by the invention is that it enables the first-page-out delay to be reduced. The first-page-out delay is the delay associated with the time from when the user starts a print job on the host (PC) until the time the first printed page exits the print mechanism. Because the invention enables the transfer of the rasterized page from the host computer to the printer to overlap temporally the printing of the rasterized page, the first-page-out delay can be reduced. In accordance with the invention, only a relatively small portion of the rasterized page needs to be stored in the formatter memory before printing of the page may commence.

A High-Speed USB Interrupt OUT endpoint is capable of receiving a maximum of three 1024 byte transfers per microframe. Each microframe corresponds to a 125-microsecond (μSec) time interval. This provides a maximum raw bandwidth of 24.6 Mbytes/Sec, which easily meets the requirements of the aforementioned HP LaserJet 1000, and other printers of that class. In addition, future printers are anticipated to have print engines capable of printing 30 ppm at 1200 dpi. Using the High-Speed USB Interrupt OUT pipe to transfer data from the host computer to the printer allows these higher print rates and resolutions to easily be accommodated.

The term "High-Speed USB Interrupt OUT pipe", as that term is used herein, is not limited to the Interrupt OUT pipe of the USB 2.0 standard, but applies equally to Interrupt OUT pipes of future USB standards, as well as similar data transfer mechanisms. However, in order to demonstrate examples of the manner in which the Interrupt OUT pipe may be used to transfer data from the host computer to. the printer, the invention will be described with reference to the Interrupt OUT pipe defined in the USB 2.0 standard.

Also, although the invention is being described for exemplary purposes with respect to its use in host-based printing systems, the invention is not limited to use in host-based printing systems. The invention may be used in any type of printing system. The invention is being described with reference to host-based printing systems due to particular advantages the invention provides when incorporated into a host-based printing system.

In accordance with the USB 2.0 standard, a High-Speed USB has 8,000 microframes per second. Referring again to the example of the HP Laserjet 1000 printer, roughly 188 bytes need to be sent every microframe. A USB Interrupt OUT pipe detects errors, but waits until the next Interrupt interval before retrying (i.e., resending the data). Therefore, in order to be able to guarantee the necessary throughput, the data should be transferred at a rate that is higher than 188 bytes per microframe. In addition, the printer should provide sufficient buffering of rasterized data such that even in the presence of several consecutive errors there will be sufficient rasterized data on reserve in the buffer to keep the print engine fed. Therefore, the rasterized data should be transferred from the host computer to the printer at a rate that is higher than the rate at which the print engine is consuming it. This will ensure that there is always sufficient raster on reserve in the buffer to prevent underrun. A conservative and practical data rate that is suitable for use with the invention is 256 bytes per microframes. Of course, the invention is not limited to any particular data rate. The data rate should be sufficiently high to ensure that enough raster is on reserve in the buffer to prevent data underrun from occurring, even in the presence of multiple consecutive errors.

Figure 3:
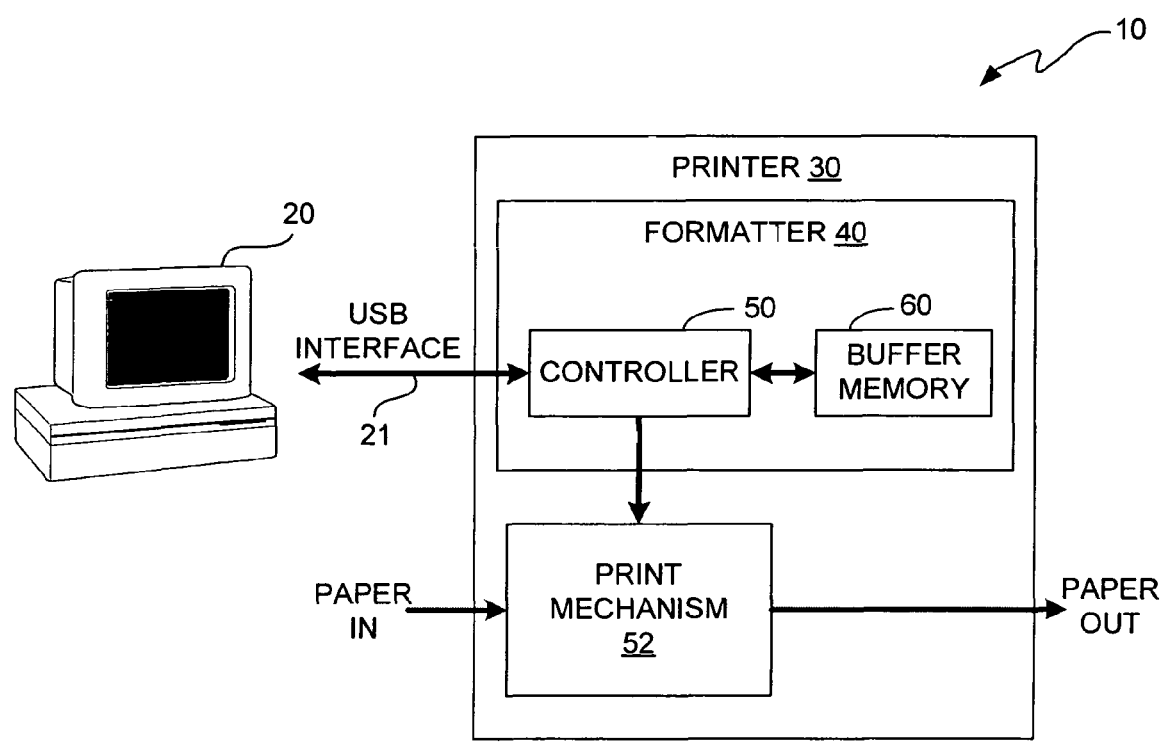
FIG. 3 illustrates a block diagram of a printing system of the invention in accordance with an exemplary embodiment.

FIG. 3 illustrates a block diagram of an exemplary embodiment of a host-based printing system 10 in which the method and apparatus of the invention are incorporated. The host-based printing system comprises a host computer 20 and a printer 30. The host computer 20 sends compressed rasterized print data over USB interface 21 to the printer 30. The USB interface may be a USB 2.0 High-Speed interface. In accordance with the preferred embodiment, the compressed rasterized print data is sent by the host computer 20 to the printer 30 using the Interrupt OUT pipe, which is defined in the USB 2.0 standard. As stated above, this Interrupt OUT pipe guarantees timeliness of delivery and provides for error correction.

A formatter 40 of the printer 30 comprises a controller 50, a buffer memory 60 and a print mechanism 52. The controller 50 receives the compressed rasterized print data sent by the host computer 20 and stores it in the memory buffer 60. As described below in more detail with reference to FIG. 4, the controller 50 reads the rasterized print data from the buffer memory 60, and causes it to be decompressed and sent to the print mechanism 52. The decompression is typically performed by a separate dedicated hardware component that has a known, guaranteed bandwidth. For simplicity purposes, the decompressor hardware component is omitted from FIG. 3.

The controller 50 is typically an integrated circuit, such as, for example, an application specific integrated circuit (ASIC). The buffer 60 may be embedded in the controller 50 or may be separate from it. The controller 50 may be any type of computational device such as, for example, an ASIC, a microprocessor, a microcontroller, a field programmable gate array (FPGA), a programmable logic array (PLA), etc. The controller 50 is not limited to any particular type of computational device. In the case where the printing system is a host-based printing system, the controller 50 need not be very a sophisticated computational device because most of the print job computations are performed by the host computer.

The controller 50 also sends a command to the print mechanism 52 that instructs the print mechanism 52 to start rolling paper and to print the rasterized print data output from the buffer 60. As the print mechanism 52 is printing the print data sent to it by the controller 50, the controller 50 is simultaneously receiving the remaining portion of the page compressed rasterized print data over the interface 21. The buffer 60 is typically a first-in-first-out (FIFO) memory device, which has, for example, 2 Kbytes of memory (i.e., 2×1024=2048 bytes). This amount of memory is capable of accommodating eight transfers of rasterized print data, with each transfer corresponding to 256 bytes (i.e., 8×256=2048). This amount of raster buffering is sufficient to enable any errors to be corrected in the print data sent by the host computer 20 to the printer 30, as is demonstrated by the examples described below with reference to Tables 1-4.

Prior to describing the examples, some USB terminology will be reviewed. USB traffic can be described as a hierarchy having three levels, namely, "transfers", "transactions", and "packets". A transfer is the highest level in the hierarchy, and there are four types of transfers: Bulk, Control, Interrupt, and Isochronous. As stated above, the invention utilizes Interrupt transfers for communications between the host computer 20 and the printer 30. Each transfer is made up of transactions. The three most common transactions are In, Out and Setup. Each transaction is made up of packets and typically consists of three phases, namely, Token/Data/Handshake.

The Out transaction used for the Interrupt transfer primary data movement includes an Out packet followed by a Data packet, both of which are sent from the host computer to the printer. Next, a handshake packet is sent by the printer to the host computer acknowledging reception of the data. The printer can communicate acceptance of the data using an "Acknowledged" (ACK) handshake packet. It can also communicate that it was unable to accept the data using a "Not Acknowledged" (NAK) handshake packet. In the event the printer detects an error in either the Token or Data phase, it will send no handshake packet and the host will recognize the error condition by timing out.

Table 1 lists the ppm and dpi capabilities of a known HP LaserJet 1000 printer, and of a printer that is anticipated to become available in the future. Table 1 also lists the data rate needed to enable the printer to achieve its ppm and dpi capabilities. This data rate corresponds to the rate at which compressed rasterized print data is transferred from the host computer 20 to the printer 30. The number of bytes per microframe that the data rates correspond to is also shown, assuming a High-Speed USB.

TABLE 1

| Product | Ppm | Dpi | USB data rate (compressed) | Bytes per microframe |
| --- | --- | --- | --- | --- |
| LaserJet 1000 | 15 | 600 | 187.5 KByte/S | 24 |
| Future | 30 | 1200 | 1500 KByte/S | 188 |

As stated above, the USB 2.0 High-Speed Interrupt OUT pipe supports up to three 1024 byte transfers per microframe. Therefore, 188 bytes per microframe is easily met. If an error occurs in the transfer, the transfer will be retried, but not until the regularly scheduled Interrupt polling interval. In accordance with the exemplary embodiment, the Interrupt polling interval is scheduled to occupy a single transfer in each microframe. In order to keep the print engine fed and prevent data underrun, the buffer 60 needs to store a sufficient amount of print data to keep the print mechanism 52 continuously supplied while the paper is rolling. In addition, the rate at which print data is transferred from the host computer 20 to the printer 30 should be greater than the rate at which the print mechanism 52 consumes the data, in order to replenish the data in the buffer 60. If these conditions are met, data underrun will not occur, even in the presence of data transfer errors.

A conservative design should withstand two or three consecutive USB transfer errors without resulting in data underrun. Tables 2, 3 and 4 demonstrate examples of the manner in which print data transferred from the host computer 20 to the printer 30 is (1) stored in the buffer 60 prior to print commencement, (2) not stored in the buffer 60 due to it being full, in which case a NAK reply is sent by the printer 30 to the host computer 20, (3) stored in the buffer 60 while the page is currently being printed and then sent to the print mechanism 52, or (4) not stored in the buffer 60 due to an error being detected, in which case the transfer will be retried. These examples assume that (1) the rate at which the print data is sent by the host computer 20 to the printer 30 is 256 bytes per microframe, (2) that the outgoing printer consumption is 188 bytes per microframe, (3) that the buffer 60 is a FIFO buffer that has the sufficient capacity to buffers eight 256 byte transfers, which corresponds to a buffer memory size of 8×256 bytes=2048=2K Bytes, and (4) the interrupt polling interval is once per microframe.

TABLE 2

| USB Microframe # | Number of bytes in FIFO at end of microframe | FIFO Changes | Notes |
| --- | --- | --- | --- |
| 1 | 256 | 256 bytes in | Interrupt transfer #1 |
| 2 | 512 | 256 bytes in | Interrupt transfer #2 |
| 3 | 768 | 256 bytes in | Interrupt transfer #3 |
| 4 | 1024 | 256 bytes in | Interrupt transfer #4 |
| 5 | 1280 | 256 bytes in | Interrupt transfer #5 |
| 6 | 1536 | 256 bytes in | Interrupt transfer #6 |
| 7 | 1792 | 256 bytes in | Interrupt transfer #7 |
| 8 | 2048 | 256 bytes in | Interrupt transfer #8 Buffer full—paper starts to roll |
| 9 | 1860 | 188 bytes out to printer | Buffer cannot accept another packet. Interrupt transfer #9 is NAK'ed. |
| 10 | 1672 | 188 bytes out to printer | Incoming packet sent before the FIFO had room to receive it. Interrupt transfer #9 NAK'ed. |
| 11 | 1484 | 188 bytes out to printer | Interrupt transfer #9 has errors. Must be retried next frame. |
| 12 | 1552 | 256 bytes in 188 bytes out to printer | Interrupt transfer #9 successful this time |
| 13 | 1620 | 256 bytes in 188 bytes out to printer | Interrupt transfer #10 Slowly refilling FIFO |
| 14 | 1688 | 256 bytes in 188 bytes out to printer | Interrupt transfer #11 Slowly refilling FIFO |
| 15 | 1756 | 256 bytes in 188 bytes out to printer | Interrupt transfer #12 Slowly refilling FIFO |
| 16 | 1824 | 256 bytes in 188 bytes out to printer | Interrupt transfer #13 FIFO nearly full |
| 17 | 1636 | 188 bytes out to printer | Buffer cannot accept another packet. Interrupt transfer #14 is NAK'ed. |

With reference to Table 2, Interrupt transfer numbers 1-8 are received at a rate of one transfer per microframe. Once Interrupt transfer number 8 has been received, the controller 50 causes the print mechanism 52 to start rolling the paper. There are now 2048 bytes of compressed print data stored in the buffer 60. During the period of microframe number 9, 188 bytes of print data are output from the buffer 60, decompressed, and sent to the print mechanism 52. There are now 1860 bytes of print data stored in the buffer 60. However, at this instant in time, the buffer 60 has insufficient storage space to store Interrupt transfer number 9. Therefore, the controller 50 causes a NAK reply to be sent by the printer 30 to the host computer 20, which informs the host computer 20 that it needs to resend Interrupt transfer number 9.

Interrupt transfer number 9 is then resent in microframe number 10 and the next 188 bytes of print data are output from the buffer 60 and sent to the print mechanism 52. There are now 1672 bytes of compressed print data in the buffer 60 at the end of microframe number 10. However, Interrupt transfer number 9 is received early in the microframe, before enough bytes have been emptied from the buffer 60 and sent to the print mechanism 52. Therefore, at the instant in time in microframe number 10 when transfer number 9 was received, there was still insufficient storage space in the buffer 60 to store the incoming transfer. Consequently, the controller 50 causes a NAK reply to be sent to the host computer 20, which informs the host computer 20 that it needs to resend Interrupt transfer-number 9 in the next microframe.

It should be noted that it is not necessarily the case that Interrupt transfer number 9 is received before the second 188 bytes of print data has been output from the buffer 60 and sent to the print mechanism 52. Interrupt transfer number 9 might instead be received late in microframe number 10 after a sufficient number of bytes of print data have been sent to the print mechanism 52 to provide space in the buffer 60 to store the incoming Interrupt transfer.

In the case in which Interrupt transfer number 9 is not stored in the buffer 60 in microframe number 10, Interrupt transfer number 9 is resent in microframe number 11. However, when Interrupt transfer number 9 is resent in microframe number 11, an error is detected in the transfer. Therefore, the print data contained in the transfer is not stored in the buffer 60. The host computer 20 determines, in the manner described below, that errors were contained in the transfer, and so resends the print data that was in transfer number 9 in microframe number 12. Transfer number 9 is successful in microframe number 12, and so the corresponding 256 bytes are stored in the buffer 60. During the period of time of microframe number 12, the next 188 bytes are read from the buffer 60 and sent to the print mechanism 52. There are now 1552 bytes in the buffer 60.

Transfer numbers 10-13 are received without errors, and the corresponding print data is stored in the buffer 60, while 188 bytes are output from the buffer 60 during the same microframes when the transfers are sent. Therefore, after the print data corresponding to transfer number 13 has been received and stored in the buffer, and the next 188 bytes have been output from the buffer 60 and sent to the print mechanism 52, the buffer 60 contains 1824 bytes of print data, and an ACK reply after data has been resent by the host computer 20. Assuming this handshake is successful, the order of the Data0 and Data1 packets will be reversed in the next transfer from the host computer 20.

TABLE 3

| USB Microframe # | Number of bytes in FIFO at end of microframe | FIFO Changes | Notes |
|---|---|---|---|
| 1 | 256 | 256 bytes in | Interrupt Transfer #1 |
| 2 | 512 | 256 bytes in | Interrupt Transfer #2 |
| 3 | 768 | 256 bytes in | Interrupt Transfer #3 |
| 4 | 1024 | 256 bytes in | Interrupt Transfer #4 |
| 5 | 1280 | 256 bytes in | Interrupt Transfer #5 |
| 6 | 1536 | 256 bytes in | Interrupt Transfer #6 |
| 7 | 1792 | 256 bytes in | Interrupt Transfer #7 |
| 8 | 2048 | 256 bytes in | Interrupt Transfer #8 Buffer full—paper starts to roll |
| 9 | 1860 | 188 bytes out to printer | Buffer cannot accept another packet. Interrupt Transfer #9 is NAK'ed. |
| 10 | 1672 | 188 bytes out to printer | Incoming transfer sent before the FIFO had room to receive it. Interrupt Transfer #9 NAK'ed. |
| 11 | 1484 | 188 bytes out to printer | Interrupt Transfer #9 received with errors—must be retried next frame. |
| 12 | 1296 | 188 bytes out to printer | Interrupt Transfer #9 received with errors—must be retried next frame. |
| 13 | 1364 | 256 bytes in 188 bytes out to printer | Interrupt Transfer #9 successful this time |
| 14 | 1176 | 188 bytes out to printer | Interrupt Transfer #10 received with errors—must be retried next frame. |
| 15 | 988 | 188 bytes out to printer | Interrupt Transfer #10 received with errors—must be retried next frame. |
| 16 | 1056 | 256 bytes in 188 bytes out to printer | Interrupt Transfer #10 successful this time |
| Microframes 17 thru 25 are slowly refilling the FIFO with Interrupt Transfer #11 thru #19 | | | |
| 26 | 1736 | 256 bytes in 188 bytes out to printer | Interrupt Transfer #20 in Slowly refilling FIFO |
| 27 | 1804 | 256 bytes in 188 bytes out to printer | Interrupt Transfer #21 in FIFO is full | thus is nearly full. When transfer number 14 is received in microframe number 17, there is insufficient storage space in the buffer 60 to store the corresponding print data, and so a NAK reply is sent to the host computer 20. The process demonstrated by Table 2 continues until the print job is complete.

For USB Interrupt transfers, there are generally two methods for dealing with errors. The first method is designed to deal with errors in the "Out" or "Data" packets of the transaction. With the first method, the host computer 20 is made aware that an error was contained in the transaction by the fact that it has not received an ACK packet from the printer 30 before the timeout period for the transfer expires. The timeout period is between 736 and 816 bits times (about 1.6 µS). The host computer 20 then resends the previous transaction.

The second method is designed to deal with errors in the handshake itself, i.e., in the ACK or NAK packets. A "Data Toggle" is used for this purpose. A data transaction utilizes either a "Data0" packet or a "Data1" packet. During successive data transactions, the order of the Data0 and Data1 packets is alternated. If the host computer 20 detects that the handshake is garbled, it will resend the transfer, but without altering the order of the Data0 and Data1 packets. The printer 30 will detect that the order of the Data0 and Data1 packets for the current transfer is the same as it was for the previous transfer. Based on the detected order, the printer 30 will determine that the handshake was garbled, and will understand that the data transaction is being repeated and will send Table 3 demonstrates an example similar to that demonstrated in Table 2, except that in Table 3 two consecutive errors occur twice. Microframes 1-11 in Table 3 are identical to microframes 1-11 in Table 2, and produce the same results. However, unlike the successful Interrupt transfer in microframe number 12 in Table 2, the Interrupt transfer in microframe number 12 in Table 3 contains errors as did the one in microframe number 11. Therefore, Interrupt transfer number 9 is resent again in microframe number 13, which is now successful. The 256 bytes contained in this transfer is stored in the buffer 60 and the next 188 bytes are output from the buffer 60, leaving 1364 bytes in the buffer 60.

Interrupt transfer number 10 in microframe number 14 is then received in the printer 30 with errors. Therefore, the data contained in the transfer is not stored in the buffer 60. The next 188 bytes is output from the buffer 60 during this microframe and is sent to the print mechanism 52. This leaves 1176 bytes of data in the buffer 60. Interrupt transfer number 10 is repeated in microframe number 15 and is received with errors. Therefore, the data contained in the transfer is not stored in the buffer 60. The next 188 bytes is output from the buffer 60 and sent to the print mechanism 52. This leaves 988 bytes of data in the buffer 60. This is the point in time when the buffer 60 has the least amount of data while the page is being printed.

Microframes 16-27 are error free, and so the corresponding data is stored in the buffer 60. During each corresponding microframe, 256 bytes contained in the transfer is stored in the buffer 60 and the next 188 bytes of data is output from the buffer 60. Because the rate at which the print mechanism 52 consumes the data is less than the incoming transfer rate, the buffer 60 slowly fills. At the end of the $26^{th}$ microframe, 1736 bytes of print data are contained in the buffer 60. By the end of the $27^{th}$ microframe, 1804 bytes are in the buffer and so it is almost full. It should be noted that the buffer 60 never runs out of data to feed he print mechanism, even when several consecutive errors occur on multiple occasions.

Table 4 demonstrates an example similar to the examples demonstrated by Tables 2 and 3, except that Table 4 corresponds to the ordinary operation of the printing system 10 when no errors occur in the transfers.

TABLE 4

| USB Microframe # | Number of bytes in FIFO at end of microframe | FIFO Changes | Notes |
| --- | --- | --- | --- |
| 1 | 256 | 256 bytes in | Interrupt Transfer #1 |
| 2 | 512 | 256 bytes in | Interrupt Transfer #2 |
| 3 | 768 | 256 bytes in | Interrupt Transfer #3 |
| 4 | 1024 | 256 bytes in | Interrupt Transfer #4 |
| 5 | 1280 | 256 bytes in | Interrupt Transfer #5 |
| 6 | 1536 | 256 bytes in | Interrupt Transfer #6 |
| 7 | 1792 | 256 bytes in | Interrupt Transfer #7 |
| 8 | 2048 | 256 bytes in | Interrupt Transfer #8 Buffer full—paper starts to roll |
| 9 | 1860 | 188 bytes out to printer | Buffer cannot accept another packet. Interrupt Transfer #9 is NAK'ed. |
| 10 | 1672 | 188 bytes out to printer | Incoming packet sent before the FIFO had room to receive it. Interrupt Transfer #9 NAK'ed. |
| 11 | 1740 | 256 bytes in 188 bytes out to printer | Interrupt Transfer #10 |
| 11 | 1808 | 256 bytes in 188 bytes out to printer | Interrupt Transfer #11 |
| 13 | 1620 | 188 bytes out to printer | Buffer cannot accept another transfer. Interrupt Transfer #12 is NAK'ed. |
| 14 | 1688 | 256 bytes in 188 bytes out to printer | Interrupt Transfer #12 |
| 15 | 1756 | 256 bytes in 188 bytes out to printer | Interrupt Transfer #13 |
| 16 | 1824 | 256 bytes in 188 bytes out to printer | Interrupt Transfer #14 |
| 17 | 1636 | 188 bytes out to printer | Buffer cannot accept another transfer. Interrupt Transfer #15 is NAK'ed. |

As shown in Table 4, under ordinary, substantially error-free operation, the buffer 60 usually has sufficient storage capacity to store the incoming transfer. Although NAK replies are occasionally sent by the printer 30 to the host computer 20, they are not so frequently sent they significantly impact USB bandwidth. This waste of USB bandwidth could be improved if the USB 2.0 specification allowed Interrupt endpoints to support the Ping/NYET protocol, but unfortunately it does not.

Figure 4:
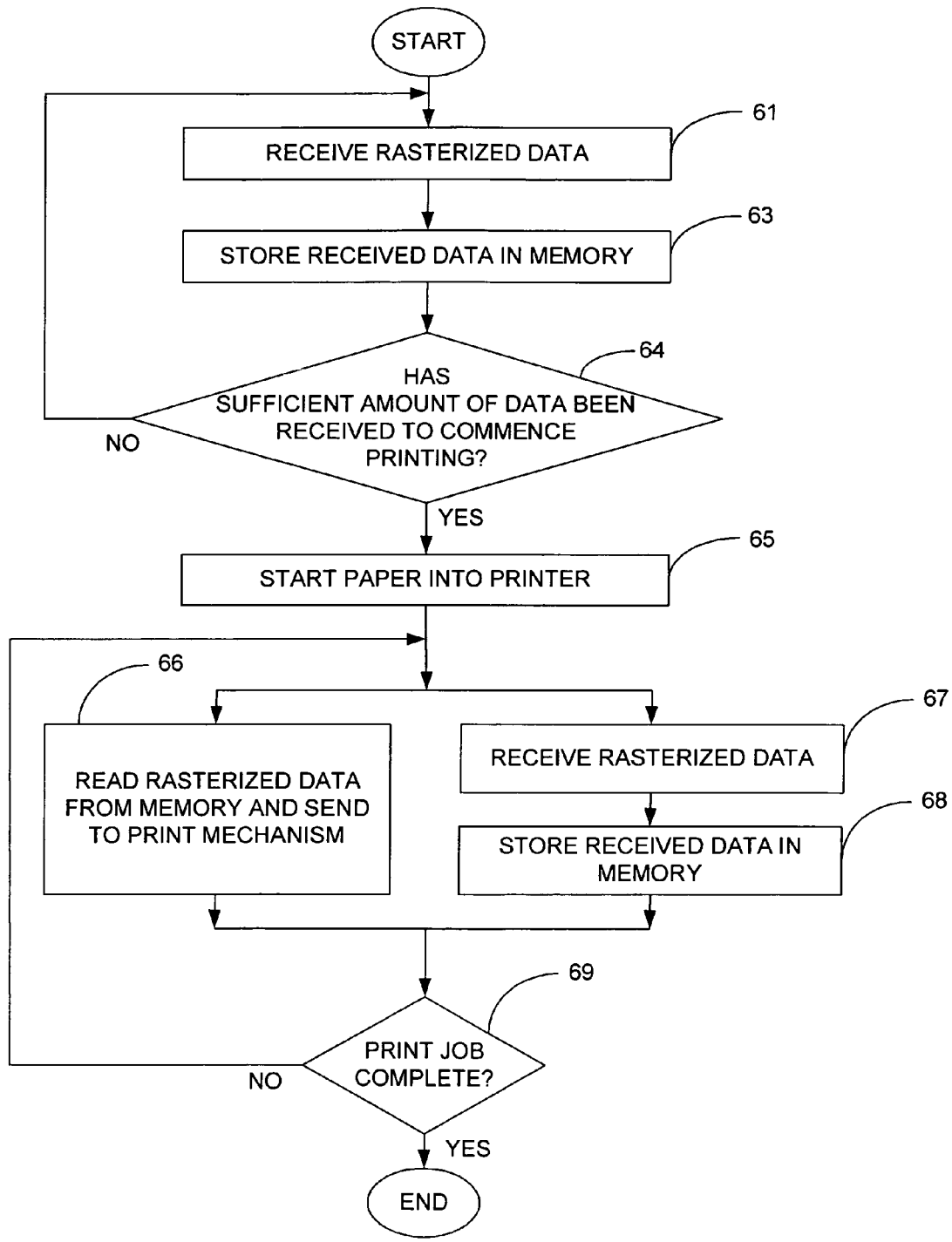
FIG. 4 illustrates a flowchart that represents the method of the invention of printing in accordance with an exemplary embodiment.

FIG. 4 illustrates a flowchart that represents an exemplary embodiment of the method performed by the printing system of the invention. The printer receives rasterized print data, as indicated by block 61. The received print data is stored in memory, as indicated by block 63. It should also be noted that the buffer may be any type of computer-readable medium such as, for example, static random access memory (SRAM), dynamic RAM (DRAM), flash memory, etc. The controller 50 may include an on-board memory for storing software programs and/or data. Alternatively, the memory device that stores the programs and/or data may be external to the controller 50. This memory device may also be any type of computer-readable medium such as, for example, RAM, DRAM, flash memory, read only memory (ROM), etc.

The controller 50 typically includes firmware for performing the functions of determining when a sufficient amount of data has been received to commence printing, storing data in the buffer 60, reading data out of the buffer 60, sending data read from the buffer 60 to the print mechanism 52, sending a command to the print mechanism to commence rolling paper, and sending a command to the print mechanism 52 to cause it to start printing. The controller 50 may perform additional functions. Also, some of the functions described above may be performed by other components of the printer 30.

A determination is made as to whether a sufficient amount of data is contained in memory to commence printing, as indicated by block 64. This will typically, but not necessarily, be a sufficient amount of data to fill up the buffer. What is important is that a sufficient amount of data is stored in the buffer before printing commences such that data underrun will not occur, or at least is unlikely to occur.

If a determination is made at block 64 that a sufficient amount of data is in memory to commence printing, paper is started in the printer, as indicated by block 65. Print data is read from memory and sent to the print mechanism, as indicated by block 66. As indicated above, the data read from memory is typically processed by a decompression algorithm (not shown) before being sent to the print mechanism. At the same time data is being sent to the print mechanism, the remainder of the print data continues to be received and stored in memory, as indicated by blocks 67 and 68. The process represented by blocks 66-68 is a continuous process that repeats until the print job is complete, as indicated by block 69. The arrow from block 69 to blocks 66 and 67 is intended merely to indicate that, until the print job is complete, print data continues to be received as data is being read out of memory, sent to the print mechanism, and printed.

The invention has been described with respect to some preferred and exemplary embodiments. However, the invention is not limited to the embodiments described herein. Modifications can be made to the embodiments described herein, and all such modifications are within the scope of the invention. For example, although the invention has been described with reference to transfers that contain 256 bytes each, the transfers may contain a larger or smaller number of bytes. Also, the rate at which data is consumed by the print mechanism is not limited to any particular rate. Other modifications may be made to the embodiments described herein, and all such modifications are within the scope of the invention.

What is claimed is:

1. An apparatus for use in a printer, the apparatus comprising:
    a print mechanism configured to perform printing of print jobs;
    a Universal Serial Bus (USB) interface configured to receive a plurality of portions of image data associated with a single print job sent to the printer from a device that is external to the printer, each of the plurality of portions of image data received during a respective transfer interval;
    a memory device configured to store image data, the memory device being in communication with the print mechanism and the USB interface;
    a controller configured to control operations of the printer, the controller causing the image data received by the USB interface to be stored in the memory device, the controller causing the image data to be read out of the memory device and sent to the print mechanism when a decision is made by the controller that a sufficient amount of the image data has been stored in the memory device to commence printing,
    wherein the USB interface is configured to transmit a particular portion of the image data during a particular transfer interval and to retransmit the particular portion of the image data during a subsequent transfer interval if an error occurs in transmission of the particular portion of the image data, the subsequent transfer interval being subsequent to the particular transfer interval and prior to receiving all of the plurality of portions of the image data associated with the single print job, and
    wherein the USB interface comprises a USB Interrupt OUT pipe configured to transfer the image data.

2. The apparatus of claim 1, wherein the controller decides that a sufficient amount of the image data has been stored in the memory device to commence printing when the controller detects that the memory device does not have sufficient available storage space to store at least one portion of the image data.

3. The apparatus of claim 1, wherein the controller decides that a sufficient amount of the image data has been stored in the memory device to commence printing when the controller determines that a sufficient amount of the image data has been stored in the memory device such that underrun will not result if the image data begins being read out of the memory device and sent to the print mechanism.

4. The apparatus of claim 1, wherein the controller decides that a sufficient amount of the image data has been stored in the memory device to commence printing when the controller detects that the memory device is full.

5. The apparatus of claim 1, wherein a rate at which the image data is received by the USB interface is greater than a rate at which the image data is read from the memory device and sent to the print mechanism.

6. The apparatus of claim 1, wherein the image data that is stored in the memory device is compressed, and wherein the compressed image data that is read out of the memory device is decompressed before the compressed image data is used by the print mechanism to perform printing.

7. The apparatus of claim 1, wherein the memory device has insufficient storage capacity to store an entire page of the image data.

8. A method for use in a printer for printing print jobs, the method comprising:
    receiving a plurality of portions of image data associated with a single print job at the printer via a Universal Serial Bus (USB) interface, each of the plurality of portions of the image data being sent to the printer by a device that is external to the printer during a respective transfer interval;
    storing the received plurality of portions of the image data in a memory device of the printer;
    deciding whether a sufficient amount of the image data has been stored in the memory device to commence printing; and
    if a decision is made that a sufficient amount of the image data has been stored in the memory device to commence printing, reading the image data out of the memory device and sending the image data to a print mechanism of the printer,
    wherein the USB interface is configured to transmit a particular portion of the image data during a particular transfer interval and to retransmit the particular portion of the image data during a subsequent transfer interval if an error occurs in transmission of the particular portion of the image data, the subsequent transfer interval being subsequent to the particular transfer interval and prior to receiving all of the plurality of portions of image data associated with the single print job, and
    wherein the USB interface comprises a USB Interrupt OUT pipe configured to transfer the image data.

9. The method of claim 8, wherein a decision that a sufficient amount of the image data has been stored in the memory device to commence printing is made upon detecting that the memory device does not have sufficient available storage space to store at least one portion of the image data.

10. The method of claim 8, wherein a decision that a sufficient amount of the image data has been stored in the memory device to commence printing is made upon determining that a sufficient amount of the image data has been stored in the memory device such that underrun will not result if the image data begins being read out of the memory device and sent to the print mechanism.

11. The method of claim 8, wherein a decision that a sufficient amount of the image data has been stored in the memory device to commence printing is made upon detecting that the memory device is full.

12. The method of claim 8, wherein a rate at which the image data is received by the USB interface is greater than a rate at which the image data is read from the memory device and sent to the print mechanism.

13. The method of claim 8, wherein the image data that is stored in the memory device is compressed, and wherein the compressed image data that is read out of the memory device is decompressed before the compressed image data is used by the print mechanism to perform printing.

14. A tangible computer-readable storage medium storing a computer program that includes instructions for controlling printing of print jobs by a print mechanism of a printer, the instructions causing a processor to:

receive a plurality of portions of image data associated with a single print job at the printer via a Universal Serial Bus (USB) interface, the plurality of portions of the image data being sent to the printer by a device that is external to the printer, each of the plurality of portions of image data being received during a respective transfer interval;

store the received image data in a memory device of the printer;

decide whether a sufficient amount of image data has been stored in the memory device to commence printing; and read the image data out of the memory device and sending the image data to a print mechanism of the printer if a decision is made that a sufficient amount of the image data has been stored in the memory device to commence printing, wherein the USB interface is configured to transmit a particular portion of the image data during a particular transfer interval and to retransmit the particular portion of the image data during a subsequent transfer interval if an error occurs in transmission of the particular portion of the image data, the subsequent transfer interval being subsequent to the particular transfer interval and prior to receiving all of the plurality of portions of image data associated with the single print job, and wherein the USB interface comprises a USB Interrupt OUT pipe configured to transfer the image data.

15. The apparatus of claim 1 wherein the USB interface is further configured to support communication of at least one packet of data to acknowledge acceptance of the image data or to indicate an inability to accept the image data.

16. The apparatus of claim 1 wherein the USB interface is further configured to retransmit the particular portion of the image data to the memory device prior to transmitting a subsequent portion of the image data to the memory device.

17. The method of claim 8 wherein the USB interface is further configured to retransmit the particular portion of the image data to the memory device prior to transmitting a subsequent portion of the image data to the memory device.

18. The tangible computer-readable storage medium of claim 14 wherein the USB interface is further configured to retransmit the particular portion of the image data to the memory device prior to transmitting a subsequent portion of the image data to the memory device.

19. The apparatus of claim 1 wherein the USB interface is removeably attached to the printer.

20. The method of claim 8 wherein the USB interface is removeably attached to the printer.

21. The apparatus of claim 1 wherein the transmission of the particular portion of the image data includes storage of the particular portion of the image data in the memory device.

22. The method of claim 8 wherein the transmission of the particular portion of the image data includes storage of the particular portion of the image data in the memory device.

23. The tangible computer-readable storage medium of claim 14 wherein the transmission of the particular portion of the image data includes storage of the particular portion of the image data in the memory device.

24. The apparatus of claim 1 wherein the USB Interrupt OUT pipe conforms to a USB 2.0 standard.

25. The method of claim 8 wherein the USB Interrupt OUT pipe conforms to a USB 2.0 standard.

26. The tangible computer-readable storage medium of claim 14 wherein the USB Interrupt OUT pipe conforms to a USB 2.0 standard.

* * * * *